(12) United States Patent
Gass (10) Patent No.: US 6,928,332 B2
(45) Date of Patent: Aug. 9, 2005

(54) PROCESS SYSTEM AND PROCESS TOOL FOR PROCESSING A WORKPIECE

(75) Inventor: Baltes Gass, Aalen (DE)

(73) Assignee: Alfing Montagetechnik GmbH, Aalen (DE)

( * ) Notice: Subject to any disclaimer, the term of this patent is extended or adjusted under 35 U.S.C. 154(b) by 669 days.

(21) Appl. No.: 09/812,568

(22) Filed: Mar. 21, 2001

(65) Prior Publication Data

US 2002/0038159 A1 Mar. 28, 2002

Related U.S. Application Data

(63) Continuation of application No. PCT/EP99/06960, filed on Sep. 21, 1999.

(30) Foreign Application Priority Data

Sep. 21, 1998 (DE) ......................................... 198 43 162

(51) Int. Cl.[7] .............................................. G06F 19/00
(52) U.S. Cl. ....................... 700/108; 700/114; 700/116; 700/259
(58) Field of Search ................................. 700/108, 114, 700/113, 115, 116, 175, 176–178, 195, 259, 95; 29/703, 709, 720, 407.04; 198/345.1, 434

(56) References Cited

U.S. PATENT DOCUMENTS 4,787,136 A * 11/1988 Majic .......................... 29/709

5,186,303 A 2/1993 Seto et al.
6,317,953 B1 * 11/2001 Pryor ......................... 700/114

FOREIGN PATENT DOCUMENTS

| DE | 36 37 236 A1 | 5/1988 |
| DE | 42 43 724 A1 | 6/1994 |
| DE | 197 23 365 A1 | 12/1997 |
| EP | 0 612 203 A1 | 8/1994 |
| GB | 2 281 237 A | 1/1995 |
| JP | 04 093 150 | 3/1992 |

OTHER PUBLICATIONS

J. Milberg: Sensorsysteme fur die Montage, in: VDI–Z, vol. 129 (Jul. 1987), No. 7; pp. 100–104.

* cited by examiner

*Primary Examiner*—Leo Picard
*Assistant Examiner*—Steven R. Garland
(74) *Attorney, Agent, or Firm*—Sughrue Mion, PLLC (57) ABSTRACT

The invention related to a processing tool and a processing device for processing a workpiece (5) that is located in a predetermined processing area (1), at a plurality of processing points (4, 4'). A recognition device (20) recognizes the individual processing points (4, 4') on the workpiece (5) or determines a relative position between the processing tool (7) and the workpiece (5). This ensures that an operator carrier out a predetermined number of processing operations without leaving out any processing point. The recognition device (20, 200) preferably comprises an image pick-up device, on or integrated in the tool (7) or an image pick-up device which picks up an image of the whole processing area (1) and evaluates it.

10 Claims, 6 Drawing Sheets

PROCESS SYSTEM AND PROCESS TOOL FOR PROCESSING A WORKPIECE

This application is a continuation of International Application No. PCT/EP99/06960 filed Sep. 21, 1999.

FIELD OF THE INVENTION

The invention relates to a process system and a process tool for processing a workpiece, more particularly in the field of automotive assembly, requiring a plurality of assembly operations on individual parts of a vehicle, for example a cylinder block or body. However, the invention is not restricted to automotive assembly, it instead being suitable for any environment requiring processing by an optional tool at a plurality of process sites.

BACKGROUND OF THE INVENTION

In industrial series production requiring implementation of a plurality of repetitive assembly operations, e.g. tightening nuts and bolts, it has become customary to automate the operations involved, i.e. tightening nuts and bolts as far as possible by employing automated tools. For example, a process system including a plurality of automated nut runners is lowered onto an cylinder head for bolting it down to the cylinder block in accordance with a predefined program. In this arrangement a process parameter programming means sets, among other things, each of the nut runners to a specific torque and/or torsion angle for tightening the individual bolts. Thus, by automatically marrying the cylinder blocks and cylinder heads, together with the process system, highly automated series production is achievable. In this case the process system itself is designed to customer specifications, i.e. the process system is tailored to the process operation to be implemented in each case so that, for example, any change in the shape of the workpieces, in this case the cylinder heads, a new process system needs to be designed.

On the other hand, there are process operations which permit handling by automated or robotic devices either not at all or only with difficulty. In addition, process operations exist for which, due to the timing cycle involved, automated assemblies cannot be put to use and thus single or multiple screw drivers or nut runners and other process tools are required for manual guidance. Thus, such process operations, in series production too, require the use of, for example in bolting, such tools as e.g. poke, offset or gunning screw drivers or nut runners or other manually guided multiple screw drivers or nut runners. Process tools of this type are likewise highly automated so that for each process operation, e.g. bolting operation, the torque and/or the torsion angle is set by a process parameter programming means and the torque and/or torsion angle measured during bolting, which is not completed until the actual parameters agree with the programmed parameters.

It will readily be appreciated that employing such a manually guided process tool permits more flexibility in use since it merely needs to be provided with a suitable adapter bush, after which a process operation can be implemented, i.e. such a process tool is not tailored to a specific workpiece, e.g. to a cylinder head, but can be put to use for any number of different process operations.

Whilst, however, it is assured with a process system tailored to a specific workpiece, as described above, that all process sites (bolting sites) are processed (bolted), problems materialize as regards process assurance when making use of a manually guided, partly automated process tool, as will be explained in the following.

In considering the case, for example, in which an adapter bush already preassembled with some parts arrives in a predefined process station, i.e. an assembly station of an automobile production line, it will firstly be assumed—although, of course, the automobile body is moved at a certain speed—that the body is stationary or at least relatively stationary in the process station. Since automobile bodies may be subject to different standards, for example a US version or EU version, the controller controlling the individual process tools is first programmed to basic data, as recorded, for example, on a production card attached to the body. At this point in time the controller and thus the process tool "see", for example, that ten different M10 bolts and fifteen M15 bolts need to be tightened. An operator thus takes an M10 adapter bush from the crib (as is also indicated optically on the crib) and implements ten times a process operation for tightening M10 nuts/bolts with the torque and/or torsion angle as programmed in each case. Once the controller has "seen" that 10 process operations have been implemented with M10 it enables the next size M15 for the corresponding number of process operations in each case. However, all that this assures is that a predefined number of process operations is implemented. It does not assure these are actually done at the corresponding process sites (assembly sites). In other words, the operator needs to strictly adhere to a predefined sequence since this is the only way of assuring that always the corresponding process site is processed with the correct process parameters.

As already mentioned, however, the body is not stationary in the process station, it instead being moved at a certain speed. This adds to the problem as explained above. For example, the operator may have already processed a few assembly sites on the next body, so that although the predefined number of bolting operations has been implemented, there is the problem of complete processing getting out of step and thus there is no longer the assurance that all bolts really have been tightened and/or with the corresponding torque/torsion angle (since there may be a change too, in the torque/torsion angle for each process operation and workpiece). This is basically a problem since predefining the torque/torsion angle in conjunction with the number of process operations is independent of the location of the process tool, it depending solely on the sequence in processing or the predefined number of operations.

PRIOR ART

Figure 1A:
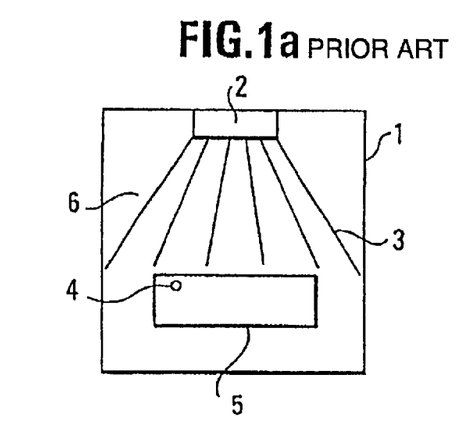
FIGS. 1a–1f is a diagram of a prior art process system including a recognizing means for identifying a tool in a process station.

DE 36 37 236 C2 disclosing the preamble of claims 1, 15 assures correct processing to a certain extent by enabling various process operations differing in sequence to be implemented with the aid of a "smart" process tool without requiring the operator to make any changes to the control system or having to enter new data. The control and monitoring arrangement disclosed therein for a process tool, more particularly a screw driver or nut runner, comprises, as shown in FIG. 1a, an emitter 2 located in the process station 1 which emits a signal 3 in a restricted zone 6 which contains information explicitly identifying the corresponding process site 4 on the workpiece. As evident in FIG. 1b it is furthermore provided for that the complete process station 1 is divided into several zones 6a, 6b each having emitters 2a, 2b for each of the process sites 4a, 4b on the workpiece.

Figure 1B:
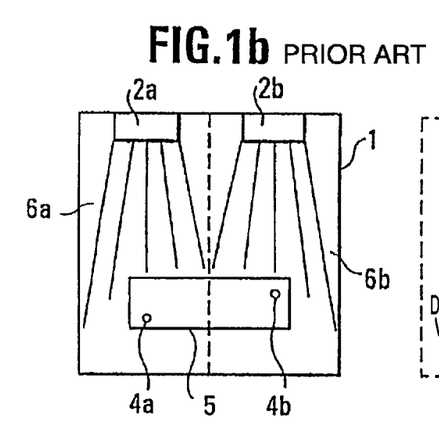
Figure 1C:
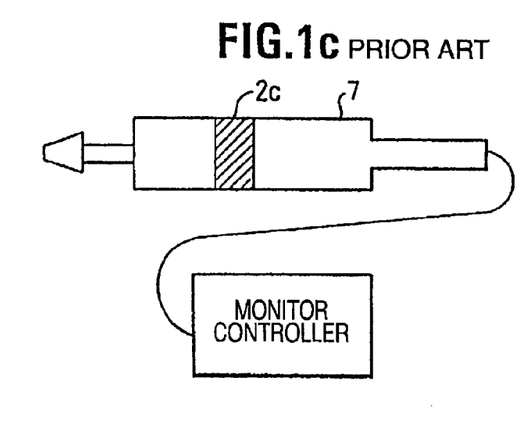

When a process tool 7 including a detector 2C applied thereto, as shown in FIG. 1c, is moved into the zone 6, 6a, 6b the detector 2c applied to the process tool 7 detects the corresponding signal 3 and the control and monitoring means sets the torque provided for the process site 4, 4a, 4b. As evident from FIG. 1f when the identification means formed by the emitter and detector identifies the tool in a certain zone (process station), design process parameters are read by the programming means 8 from a memory 9 and output to the tool 7, whereby during processing a comparator 10 compares the actual values to the design values.

However, despite output of a signal identifying the assembly site, the system is unable to explicitly determine whether the operator really has bolted or processed the corresponding site, it instead merely "seeing" whether the process tool is present in the predefined zone at all, i.e. there is no correlation with the location of the workpiece. Here, the system assumes that the workpiece is precisely at the programmed location and oriented as predefined and/or the whole process station 1 needs to be discretionalized so finely that each and every zone is "illuminated" by a corresponding emitter 2d, 2e, 2f, 2g as shown in FIG. 1e.

Figure 1D:
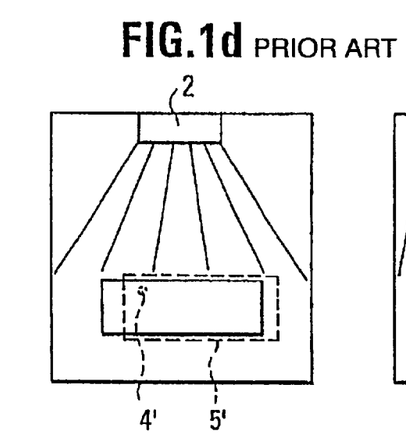
Figure 1E:
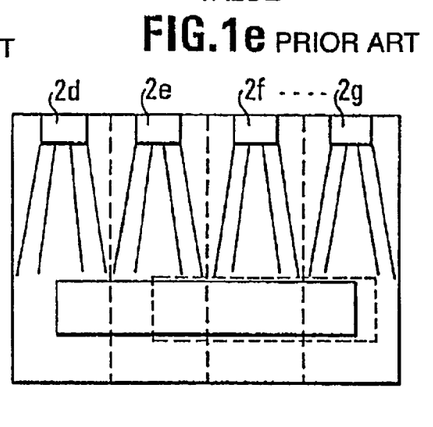
Figure 1F:
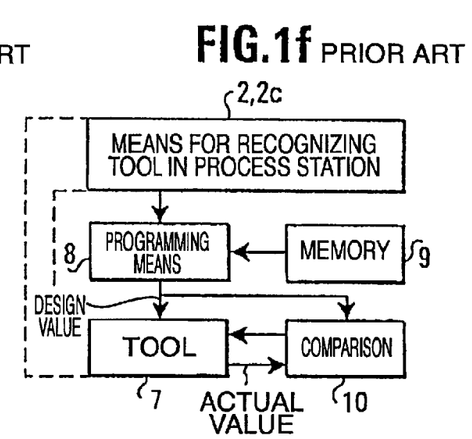

Should, however, the workpiece be slightly out of place, as indicated by the broken lines in FIGS. 1d, 1e, then the monitoring device provided there is unable to "see" whether the operator really has bolted the corresponding site since there is no assignment of the tool to the workpiece or to the assembly site whatsoever. At concealed sites, for example on the underside of a body, the system has no way at all of "seeing" whether a process tool is correspondingly located in the zone, unless individual zones are illuminated also from underneath by one or more emitters.

DE 197 23 365 A1 describes a method and a system for remachining a part in which the position of the tool is established by means of an emitter/detector assembly. More particularly, at least one emitter unit or detector unit is assigned to the workstation for emitting and detecting respectively signals to/from a detector unit or emitter unit assigned to the tool and connecting the processing means.

U.S. Pat. No. 5,186,303 relates to a device for determining the location and orientation of an object on a substrate, more particularly the deviation from an ideal position. A CCD camera together with a pattern recognizing section is used to identify the actual position of a variable resistor or the like applied to the object.

DE 42 43 724 A1 discusses a method of positioning workpieces with the aid of a camera. The workpiece is positioned (translatory and/or rotationally) as desired with the aid of a camera, an image analyzer and a positioner in obtaining a plurality of typical images of the workpiece whilst being rotated and/or shifted translatory.

OBJECT OF THE INVENTION

Although, as already explained above currently available automated process tools permit processing with programmed process parameters, whereby by sensing the actual parameters during processing it is also assured that the design process parameters are maintained, recognition can be implemented to "see" whether a process tool is located in a specific zone of the process station, there is nevertheless a requirement for a higher degree of process assurance to prevent an operator from working at wrong sites with unsuitable process parameters, due to a confusion in work schedules, for example.

It is thus the object of the present invention to sophisticate a process system and a process tool of the aforementioned kind so that it is assured that an operator actually undertakes processing at programmed process sites on the workpiece, independent of the location of the process tool in the process station.

ACHIEVEMENT OF THE OBJECT

This object is achieved by a process system as set forth in claim 1: in accordance with one aspect of this process system a recognizing means is provided which identifies each process site on the workpiece, and thus now there is no assignment of the process tool to a specific zone of the process station, instead the actual site to be processed by the process tool is identified. An operator is thus now free to implement the process operations in any sequence, the system always assuring that the operations predefined by the work schedule in the controller are implemented correctly sited.

The object is also achieved by a process system as set forth in claim 2. In accordance with one aspect of this process system a recognizing means is provided which identifies the location, i.e. the position of the process tool in the process station, the location, i.e. position of the workpiece in the process station and from which it is able to determine the location of the process tool relative to the process site in each case. Once the location of the process tool and the location of the workpiece has been recognized then—since the process sites on the workpiece are always programmed (for example in a memory)—the system is always able to keep track of whether the process tool has been guided to the corresponding process site, also in the corresponding sequence, where several process sites are concerned, so that here too, the system is able to assign the process tool not, for example, to each zone, as in prior art, but to the process site itself. In other words, identifying the process site is implemented implicitly via locationing.

In accordance with a further aspect of the invention the recognizing means comprises a means for imaging at least one section of the workpiece in which at least one process site is located.

The imaging means may be preferably mounted on the tool or arranged integrally therein. Now, even if an operator moves the process tool anywhere in the process station, it is still assured that the work is done correctly sited, since the portion located ahead of the process tool is explicitly imaged. The imagings are then compared by an image processing means with predefined maps and programmed ting the process parameters is implemented on the basis of the imagings, thus assigning programmed ting of the process parameters explicitly to the imaged, i.e. recognized process site. Preferably the recognizing means comprises an image processing means and an image memory, the image processing means comparing a map imaged by the imaging means with programmed process site maps held in the image memory and outputs an identification signal in identifying a programmed process site to a process parameter programmed ting means when agreement between the imaged map and a memorized process site map is established. Comparing the image data held in the image memory and the data imaged by the imaging means is preferably done with the aid of a logic, it being good practice to use fuzzy logic for the comparison to reduce the complication thereof.

In accordance with a further embodiment of the invention the imaging means is not applied to the process tool itself but at predefined locations in the process station so that at least part of the process station is imaged in which at least one workpiece is located. Thus, when the workpiece, for example, is moved at a predefined speed through the process station, a specific process site can now be identified. Preferably, the system recognizes whether processing has been done at the identified process site, i.e. when a process tool, likewise identified, is identified in the region of the process site. For identifying the process site and the process tool usual map recognition procedures may be employed.

Preferably the imaging means comprises a video camera or infrared camera. To also identify process sites at concealed or non-illuminated locations the process tool preferably comprises a light source for illuminating the process station or a part thereof ahead of the process tool.

Preferably an enabling means is provided which does not enable processing with the programmed process parameters until the recognizing means has identified a programmed process site. On the basis of the identified process sites a counter means can count how often, in accordance with a work schedule, a process site has been identified and how often processing with programmed process parameters has been implemented at this process site.

The process tool may be preferably a screw driver or nut runner. Preferably the process system comprises a means for sensing actual processing parameters and a means for comparing the sensed actual parameters to the design parameters for controlling the process tool so that in processing the actual parameter is brought into agreement with the design parameter.

In accordance with yet another aspect the process tool is provided with at least one marking and the recognizing means comprises an imaging means for imaging the process station, an image processing means identifying the location of the tool by processing the image of the marking and of the workpiece or at least part of the workpiece.

By means of predefined markings an image processing means is able to analyze movement maps of the process tool in establishing whether a predefined number of operations at each of the process sites has been implemented. More particularly the recognizing means is able to sense the speed at which the workpiece is moved on the basis of time-tracking the change in position of one or more process sites.

When a process tool is provided with several markings then the image processing means is also able to determine the angular orientation to the process site from analyzing the coordinates of both markings relative to the coordinates of the process sites or to a fixed system of coordinates.

Preferably the process tool comprises a set of process units in a predefined orientation. In this case a counter means of the recognizing means is able to enable the process tool at a subsequent process site only when the process tool, i.e. process units have assumed a plurality of programmed locations relative to the process site, more particularly a predefined number of various angular orientations.

Preferably the recognizing means comprises a workpiece memory for memorizing workpiece data, the image processing means of the recognizing means determining the location (coordinates) of a reference coordinate point of the workpiece image and determines the location of the tool relative to the workpiece by analyzing the spacings between the coordinates of the marking and each process site with reference to the workpiece data held in the workpiece memory, more particularly relative to the data as to the location of the process sites. When the coordinates of the workpiece marking and those of a specific process site agree, or agree at least within a tolerance range, then the system recognizes that processing is implemented at the corresponding location. On the basis of this recognition the tool can be enabled and/or the design values defined.

To further enhance process assurance, a process system comprises in another embodiment of the invention a process system in accordance with a first aspect of the invention, as described above, and a process system in accordance with the second aspect of the invention as described above, i.e. all embodiments of the first aspect and all embodiments of the section aspect may be used in common. Thus, for example, when the recognizing means are each configured as imaging means the process tool is able to explicitly identify the process site (first aspect) and simultaneously the imaging means (of the section aspect) monitors the location of the process tool relative to the process site. This is particularly of advantage when several process tools are in operation and a one process tool is working at a concealed process site whilst another is working at a process site which permits imaging in thus enabling the location of the process tool relative to the workpiece to be determined.

BRIEF DESCRIPTION OF THE DRAWINGS

Further advantageous embodiments and improvements of the invention are set forth in the sub-claims. More particularly the invention comprises embodiments materializing from features claimed or described separately in the claims and subsequent description. The invention will now be detained by way of its embodiments with reference to the drawing in which:

It is to be noted that like parts are identified by like reference numerals in the drawings. Embodiments of the invention will now be described with reference to the drawings, firstly with a discussion of a first aspect of the invention with reference to FIGS. 2–4.

FIRST ASPECT OF THE INVENTION

Figure 2:
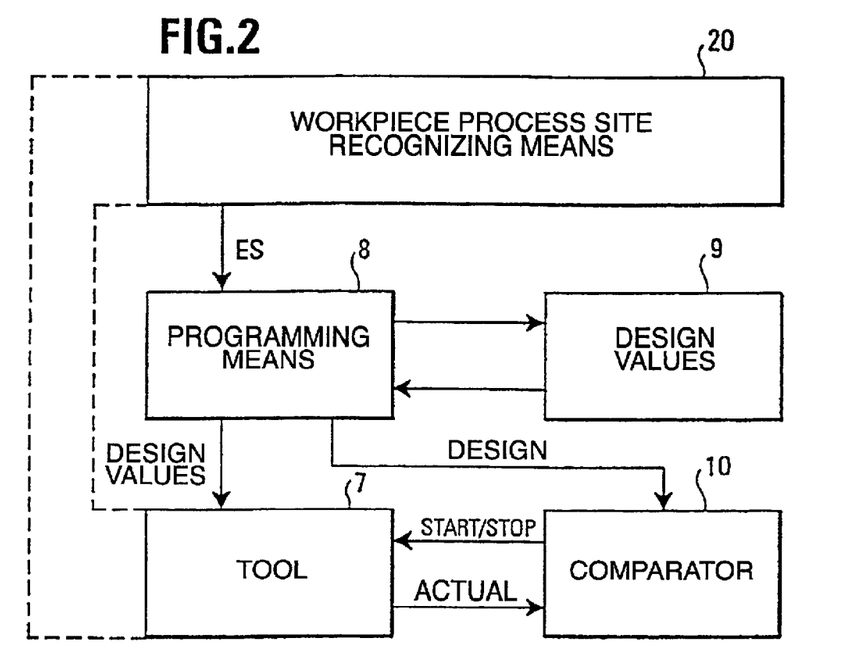
FIG. 2 is a block diagram of a process system in accordance with a first aspect of the invention.

Referring now to FIG. 2 there is illustrated a block diagram of a system for processing a workpiece including a recognizing means 20 in accordance with the invention. This process system is provided for processing a workpiece 5 located in a predefined process station 1 at a plurality of process sites 4 as indicated in principle in FIG. 1a. The process system comprises at least one process tool 7 for processing the workpiece 5 at each process site 4 and a recognizing means 20. The recognizing means 20 is devised to identify each of the process sites 4 on the workpiece. When the recognizing means 20 identifies a process site 4 it outputs an identification signal ES to a process parameter programming means 8. The identification signal ES indicates whether a process site and/or which process site has been identified. It is on the basis of this information in the identification signal ES that the process parameter programming means 8 reads process parameter design values from a memory means 9 and outputs them to the process tool 7. During processing a comparator means 10 compares the actual process parameters to the design process parameters. When the actual values agree with the design values the comparator means 10 halts, for example, the process tool 7.

As indicated by the broken lines in FIG. 2 the recognizing means 20 may be part of the process tool 7 itself, formed by parts of the process tool 7 and a separate recognizing means 20 or by a totally separate recognizing means 20 as will be later explained with reference to the embodiments.

The process system as shown in FIG. 2 works such that, as a function of the signal ES, each programmed process parameter is read from the memory means 9 and then the process tool 7 (or several process tools 7 when several process sites are identified) undertakes processing at each of the process sites. Thus, in accordance with the invention processing is implemented as a function of identifying the actual process sites and not as a function of the location of a process tool in the process station 1 or in the zones 6, 6a, 6b of the process station 1 as in prior art as explained with reference to FIG. 1.

This functioning will now be discussed by way of an example. It is assumed that the workpiece 5 is a motor vehicle or part of a motor vehicle (for example a vehicle body as explained above) whereby in this case the process sites 4 are predefined assembly sites on the motor vehicle or on the part, the process station 1 is a predefined station of an assembly line and processing relates to assembling items to predefined assembly locations. Assembly may involve, for example, securing a preassembled engine in the engine compartment of the body. The engine block is bolted top and bottom to the body, for example, although other assembly sites may be arranged adjoining these boltings, possibly even requiring the same bolt size. In other words the body is moved along the assembly line or is actually stationary, i.e. more particularly, irrespective of whether a process tool is located in the assembly station, the recognizing means 20 in accordance with the invention identifies the assembly sites (even when difficult to access). This thus always assures that the operator with the process tool, for example an AUTO screw driver or nut runner, bolts at the correct site. Irrespective of the sequence in which the operator then implements bolting at individual bolting sites, the process system is able to recognize on each bolting operation which process site is involved and by outputting the identification signal ES programs the corresponding process parameters (e.g. torque and/or torsion angle), thus preventing the operator from bolting at some process site with wrong process parameters and/or at wrong process sites.

It will be appreciated that due to the process sites being identified it is now possible to assign the process parameters to each process tool and to the process parameters correct in each case (the programmed parameters and the actual parameters as sensed during processing) unlike prior art in which merely a general siting of the tool in the process station is made.

Embodiments of the recognizing means will now be discussed by means of which each process site can be identified on the workpiece 5.

The recognizing means 20 may comprise a means for imaging at least one section of the workpiece 5 in which at least one process site 4 is located. The imaging means may be a camera, more particularly a video camera or an infrared camera. More particularly, when the workpieces (e.g. vehicle parts) are on the move, making use of a video camera is of advantage. When the workpiece 5 is stationary then using a photo camera is suitable.

Figure 3A:
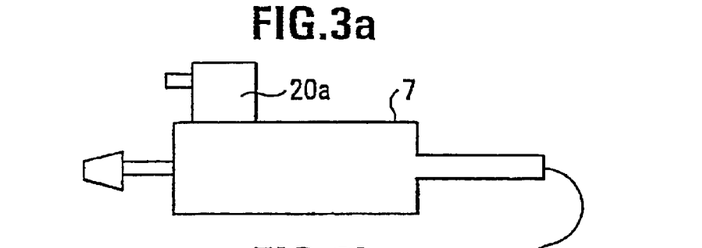
FIGS. 3a, 3b, 3c are diagrams of embodiments of a process tool including a recognizing means in accordance with a first aspect of the invention.
Figure 3B:
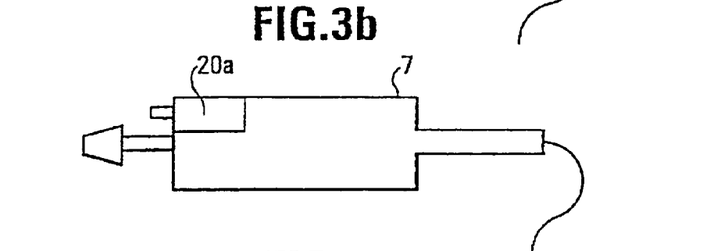

Various arrangements of the imaging means of the recognizing means are possible. As shown in FIG. 3a the imaging means 20a (possibly together with other processing units of the recognizing means 20) may be mounted on the process tool 7 itself (e.g. by means of a support) or arranged integrally in the process tool 7 (i.e. in its housing), as shown in FIG. 3b. Depicted in FIGS. 3a, 3b as an example of a process tool as a screw driver or nut runner, although, of course, any other type of process tool, e.g. sanders, turning tools etc. may be involved depending on the process required to be undertaken on the workpiece. Making use of an imaging means arranged on the tool or integral therewith is particularly of advantage when processing needs to be done at locations on the workpiece which are relatively difficult to access, i.e. the imaging means serves as a kind of "target telescope" with which the operator can "shoot" the process site concerned and on the basis of the imaged data the process site is identified. Even when the operator needs to position himself with the process tool at the locations inaccessible, for example in working from underneath in bolting the engine block, imaging is still possibly irrespective of the location and the angle orientation of the process tool relative to the process site, this image then be further processed as will be discussed later. To "illuminate" the part of the workpiece located ahead of the process tool 7, for example at concealed locations, the process tool 7 may furthermore comprise a light source which illuminates the portion located ahead of the process tool to thus permit good imaging by the imaging means. When the image processing means is a video camera or an infrared camera the light source may be a normal lamp or an infrared light source.

Data communication from the imaging means to an image processing means provided separately may be wireless or by cable, it also being possibly to multiplex the signals on the umbilical already provided for controlling the tool. It is particularly of advantage to employ fiber-optic cable for communicating imaging.

Figure 3C:
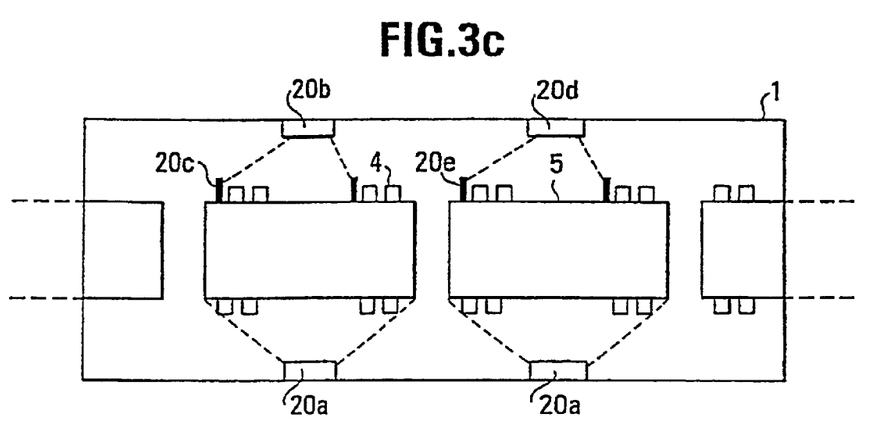

Referring now to FIG. 3c there is illustrated another embodiment of the recognizing means 20 in which one or more imaging means 20a is/are arranged in the process station 1 at the programmed locations. As shown in FIG. 3a at least part of the process station 1 is imaged in which at least one workpiece 5 is located. FIG. 3c shows, as an example, several workpieces 5 arranged on an assembly line, each workpiece 5 being assigned an imaging means. This thus enables the process sites to be identified even when the imaging means 20a is not applied to the process tool 7, as shown in FIGS. 3a, 3b.

Figure 4:
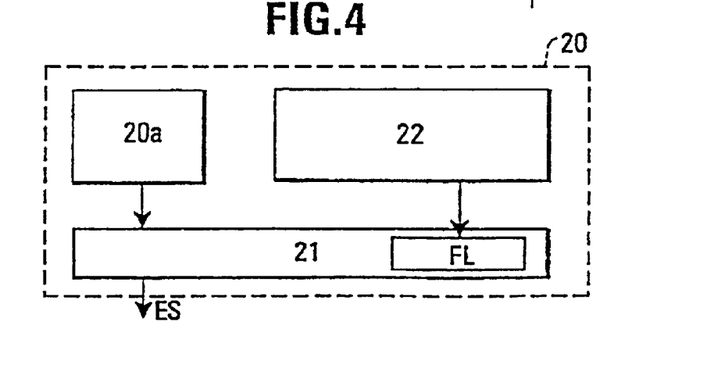
FIG. 4 is a diagram of an embodiment of the recognizing means including an imaging means 20a, an image memory 22 and an image processing means 21.

Referring now to FIG. 4 there is illustrated an embodiment of the recognizing means 20 including an image processing means 21 and an image memory 22. Irrespective of whether the imaging means 20a is mounted on the housing of the process tool 7, integrated in the housing of the process tool 7 or identification provided separately in the process station 1, the image processing means 21 compares a pixel map imaged by the imaging means 20a to the programmed maps of the process sites memorized in the image memory 22 and outputs the identification signal ES as to identification of a programmed process site to the process parameter programming means 8 when agreement is established between the imaged pixel map and the memorized pixel map of the process sites.

Comparing the imaging data to the reference map in the image memory 22 is implemented with the aid of a logic FL. Typically, before commencing processing, a teach operation is done with the imaging means by mapping each of the process sites on a sample workpiece several times for memorizing reference maps in the image memory 22, thus enabling a plurality of pixel maps for a plurality of process sites to be pre-memorized in the image memory 22.

Comparing images in processing may be implemented by the logic FL so that each pixel map imaged in processing is compared to a plurality of memorized reference maps. For this purpose, use is made preferably of fuzzy logic. Comparing images with the aid of fuzzy logic is prior art and thus will not be discussed in the present.

In any case, on the basis of that imaged, an identification signal ES can be output to the process parameter programming means 8 which explicitly indicates which process site is involved.

The image processing means, the imaging means and the image memory may all be integrated together in or on the tool so that merely the identification signal needs to be communicated to a host controller of the tool.

The process system may comprise an enabling means which enables processing with the process tool 7 using the process parameters as programmed in each case only when the recognizing means 20 outputs a corresponding identification signal as regards a corresponding process site 4. In other words, the operator "shoots" an intended process site with the imaging means 20a until the enabling means enables the process tool with the programmed process parameters, thus ensuring by unique means that the process tool is "navigated" to the correct process site which in addition is then processed with the process parameters as correctly provided therefor.

As explained at the outset, the process tool operator normally receives a work schedule so that a predefined number of process tools are first implemented e.g. with a M10 adapter bush and then with a M15 adapter bush in sequence. When using the imaging means in accordance with the invention in conjunction with a counter means it can also be assured that the predefined number of process operations has been implemented at the correct process sites, i.e. preventing the operator from attempting to bolt the same site twice whilst some other site is not processed at all. In other words, on the basis of the process site being identified the recognizing means is able to "see" that a process operation has already been successfully implemented at a specific process site, it being then, and only then, that the counter means considers the process operation (consisting of e.g. several individual bolting operations) to be concluded and resumes counting. If the operator attempts to reprocess the already finished process site, then the counter will not recommence counting and preferably the enabling means will not re-enable the process tool at this process site.

SECOND ASPECT OF THE INVENTION

Figure 5:
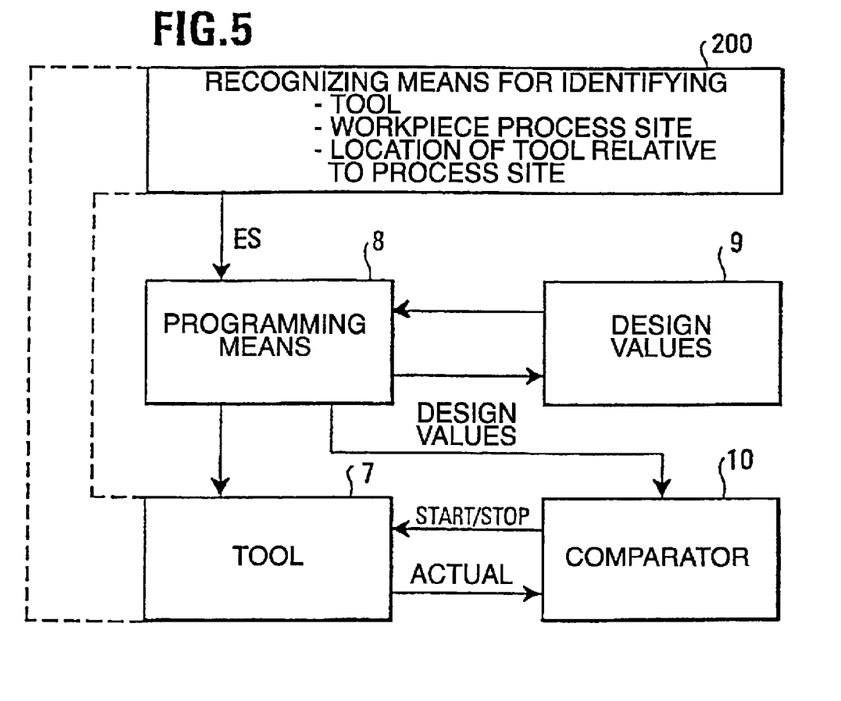
FIG. 5 is a block diagram of a process system in accordance with a second aspect of the invention.
Figure 6:
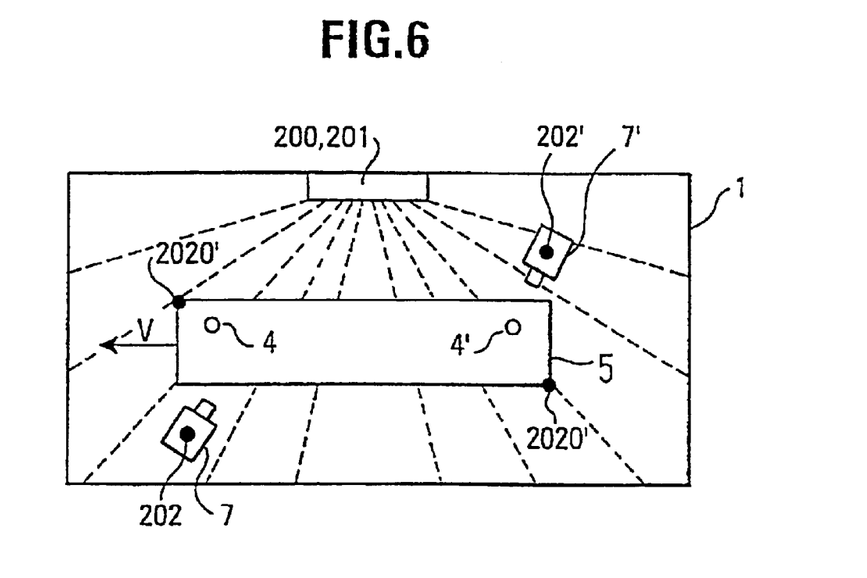
FIG. 6 is a diagram explaining the functioning of the process system in accordance with a second aspect of the invention as shown in FIG. 5.

FIG. 5 depicts a block diagram of a process system for processing a workpiece in accordance with a second aspect of the invention. FIG. 6 shows a view similar to that as shown in FIG. 3c in conjunction with the second aspect of the invention.

Referring now to FIG. 6 there is illustrated how in the second aspect of the invention too, a workpiece 5 is arranged in a programmed process station 1 and is processed at a plurality of process sites 4, 4' with programmed process parameters by at least one process tool 7, 7'. A recognizing means 200 is provided to identify the location and/or and angle orientation of the process tool 7, 7' in the process station 1, to identify the location of the workpiece 5 in the process station 1 and to determine therefrom the location of the process tool 7 relative to each process site 4. Once a predefined location of the workpiece (and/or a specific process site on the workpiece) relative to the tool has been recognized, the recognizing means 200 outputs the identification signal ES to the process parameter programming means 8 which, just the same as shown in FIG. 2, reads the corresponding design values from the memory means 9 for outputting to each process tool 7, 7' and to the comparator means 10. During processing, the comparator means 10 compares the actual values to the design values and controls the process tool 7 in the same way as shown in FIG. 2.

Exactly the same as shown in FIG. 2, the broken line in FIG. 5 indicates that the recognizing means 200 consists of partly a separate recognizing means 200 as well as parts of the tool 7 itself, as will be discussed later.

The functioning of the recognizing means in accordance with the second aspect will now be detailed by way of an example. As already mentioned at the outset, this requires an operator to implement, for example, on a vehicle body, a predefined number of process operations in a forward portion thereof and then to move to a rear portion where a predefined number of process operations are to be implemented. In this arrangement, it is not mandatory for the system to recognize whether each process tool 7, 7' has actually come into contact with the process sites 4, 4', it being sufficient for the system to determine that process tool 7, for example, as shown in FIG. 6 is located "in the envelope of the forward portion of the workpiece including the process site 4" and the process tool 7' is located "in the rear portion of the workpiece 5 including the process sites 4'". Once the system has recognized the location of the process tool 7 in the process station 1 and the location of the workpiece 5 in the process station 1, it is always able to define the location of the tool relative to the workpiece once the process sites, i.e. the coordinates thereof in the workpiece are known.

Preferably there is no need for the system to explicitly identify the process site 4, 4', it being sufficient for it to determine whether a process tool 7 is located in a specific envelope of the process sites 4, 4'. In this case it is again to be noted, more particularly, that in series production the workpiece 5 is moved through the process station 1 at a predefined speed v so that by continually tracking the location, the system is able to "see" in which portion of the workpiece 5 each process tool 7, 7' is located. In other words, the same as in the first aspect of the invention, here too, the location of each process tool 7 relative to each workpiece 5 is recognized.

Contrary to this, prior art as discussed with reference to FIG. 1b is unable to relate workpiece and process tool, especially when the workpiece 5 is on the move at a speed transversely in the process station 1, since it is only able to identify the tool in each zone 6a, 6b, this being totally independent of the location of the workpiece 5.

Figure 7:
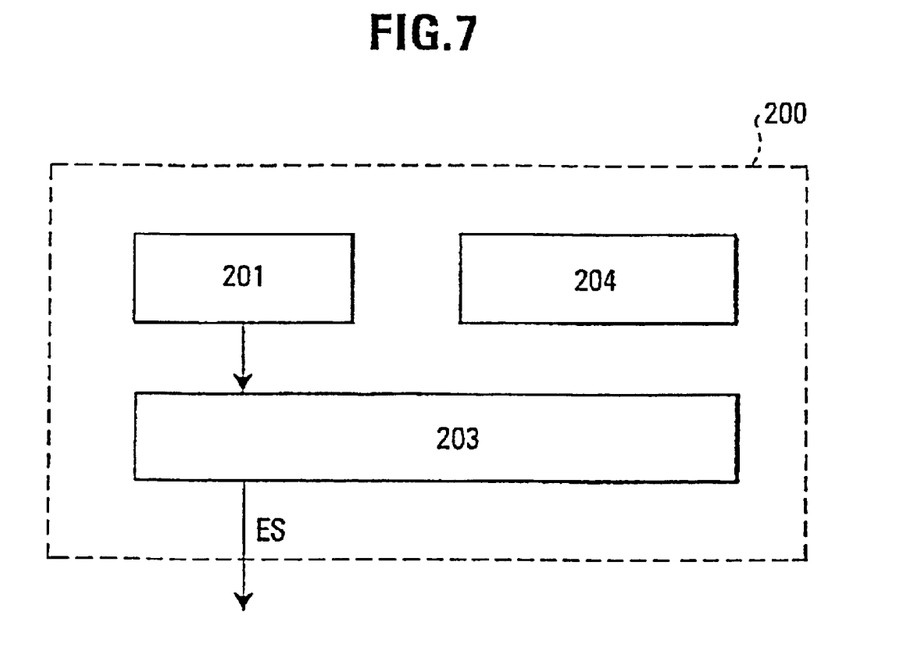
FIG. 7 is a diagram of an embodiment of the recognizing means 200 as shown in FIG. 6.

Embodiments of the means for recognizing the relative location will now be detained. As shown in FIG. 6 the recognizing means may comprise at least one marking 202 applied to the at least one process tool 7, 7', an imaging means 201 as shown in FIG. 5 for imaging the process station 1 and an image processing means 203 for recognizing the location of the process tool 7 in outputting the identification signal ES, as shown in FIG. 7. In the image of the process station 1 (or at least a portion in which the workpiece 5 and the process tool are located) imaged by the imaging means 201, the image processing means 203 implements a simple identification of the location of the process tool 7 by analyzing the location of the marking 202, 202'. In other words, there is no need for the image processing means to explicitly map each tool, it instead being sufficient to merely analyze a characteristic feature such as the marking 202 as regards its location in the process station 1. All that is important is that the location, i.e. the position of the tool (and possibly also the orientation of the tool, as will be explained later) is sensed in relating it to the workpiece.

The location of the workpiece in the process station can be identified either by comparing a complete map of the workpiece (e.g. fuzzy logic as described above) with programmed reference workpiece pixel maps in a pixel map memory means 204, or it can be undertaken in a way similar to that of identifying the location of the process tool 7, i.e. the image processing means 203 is able to process the image of the workpiece 5 and compare it to programmed workpiece image data in the same way as for image comparison as shown in FIG. 4.

Figure 8A:
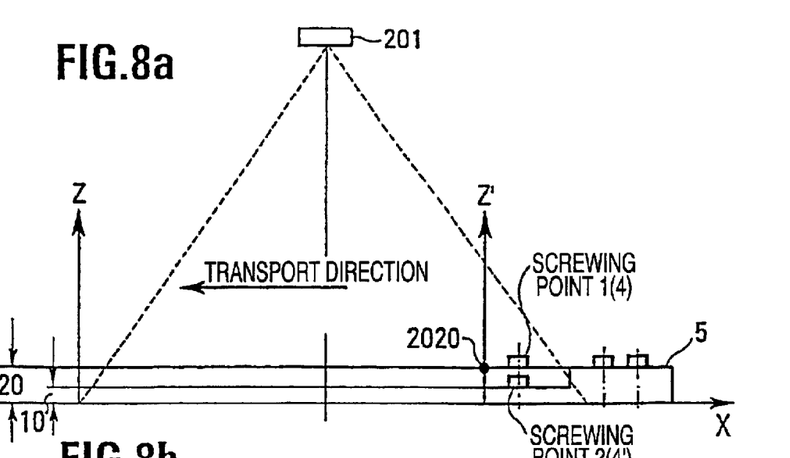
FIGS. 8a, 8b, 8c are diagrams explaining the functioning of the recognizing means when the location of the tool relative to the workpiece is imaged on the basis of coordinate computations.
Figure 8B:
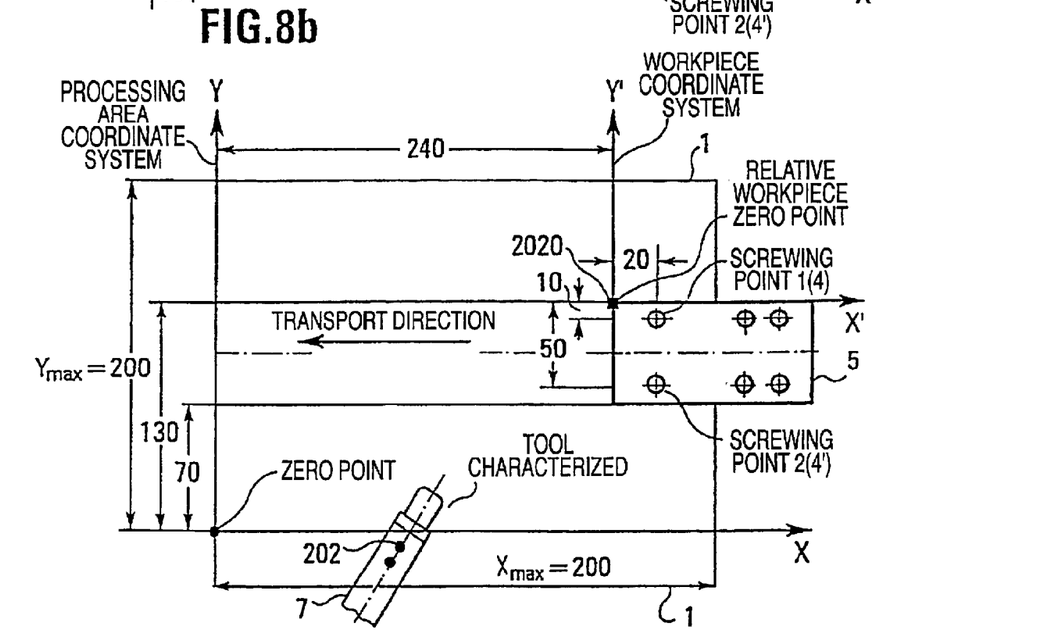

It is, however, not a mandatory requirement that the image processing means 203 recognizes the complete workpiece 5 (or its location relative to the process station 1), it instead being quite sufficient when the image processing means 203 senses, for example, a forward section of the workpiece 5 on it entering the process station 1, as indicated diagrammatically in FIG. 8b. Thus, as soon as the location of a characteristic feature of the workpiece (e.g. a predefined pattern or a datum) has been recognized in the process station 1, every section of the workpiece, more particularly the process sites thereof, can be simply determined on the basis of the workpiece data already memorized (i.e. arrangement of the process sites) in the memory means 204.

Assuming, for example, that the workpiece 5 is always moved through the process station in a straight line in the transport direction, as shown in FIG. 8b, then it may be quite sufficient for the system to identify a characteristic section of the workpiece, for example a corner and to track the movement of this section. Once a certain portion on the corner 2020, as shown in FIG. 6, has been sensed, then simply analyzing this portion may be sufficient to determine the location of the workpiece in the process station (and therefrom the siting of the process sites). However, also two portions 2020, 2020' of the workpiece may be identified, from which the location of the workpiece in the process station 1 is determined. Once all workpiece data have been stored in the memory 204, it may be quite sufficient to provide the workpiece at each section thereof as known with one or two markings 2020, 2020<< similar to the marking 202 on tool 7 and to determine the location of the workpiece therefrom.

As soon as the location, i.e. the position of the process tool 7, 7' and the position of the workpiece in the process station has been recognized on the basis of the identified section or on the basis of the marking 2020, the location of the tool relative to the workpiece can be determined on the basis of the known workpiece data (more particularly on the basis of the known location of the process sites 4), for example the absolute spacings between process tool and process site.

Referring now to FIG. 8a (side view) and FIG. 8b (plan view) there is illustrated an embodiment of the second aspect of the invention in which an imaging means 201 in the form of a camera or infrared camera scans the process station 1, more particularly the process tool 7 and the workpiece 5 from above. A further camera 201 can be simultaneously employed for scanning the workpiece 5 also from the side, should further process sites exist there, for implementing three-dimensional location of the tool relative to the workpiece. In the image processing means a fixed system of coordinates X, Y, Z is assigned to the monitored process station. Now, as soon as the image processing means has recognized the section 2020 (e.g. a characteristic part or a fiducial mark) of the workpiece 5 on it entering the process station 1 (i.e. into the coordinate range xmax=300; ymax=200 assigned to the process station 1) the relative locations (coordinates) of the bolting sites 1, 2 can be determined for a fixed point in time on the basis of the known workpiece data held in the memory means 204. Arranged in the image of the process station 1 is the system of coordinates X, Y, Z, whereby e.g. as regards the zero point X=0;Y=0 the relative locations of the bolting sites 1,2 are determined.

When the recognized section of the workpiece is a fiducial mark, this is employed as the workpiece zero point of the workpiece system of coordinates x', y', z'. When a whole section of the workpiece is recognized e.g. by a pattern identification, then a programmed location in the section is used as the workpiece zero point. When e.g. the relative workpiece zero point 2020 of the workpiece system of coordinates x', y' has a location x=240, y=130 in the system of coordinates of the process station and the bolting sites 1, 2 comprise as regards this relative workpiece zero point 2020 the coordinates x=20, y=−10, z=0 (bolting site 1) and x=20, y=−50, z=−10 (bolting site 2), then also the absolute location of the bolting sites 1,2 in the system of coordinates X,Y,Z can be determined.

In just the same way, the location of the process tool 7 can be computed consecutively on the basis of the location of the recognized marking 202 in the system of coordinates X,Y,Z. When the coordinates of the relative workpiece zero point 2020 and possibly of the bolting sites (held in the memory relative to the workpiece zero point) are known and consecutively computed and simultaneously the location of the process tool 7 is analyzed on the basis of having determined the coordinates of the marking 202 in the system of coordinates X,Y,Z, then the location of the tool (i.e. the marking 202) relative to the workpiece and more particularly to the bolting sites process station 1, 2 (4, 4') can always be computed.

Figure 8C:
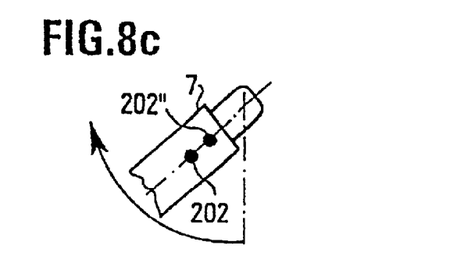

When the tool 7, as shown in FIG. 8c, is provided with two marking 202, 202", in addition to determining the location relatively, the angular orientation of the process tool 7 relative to the workpiece 5 or to each process site 4, 4' of the workpiece 5 can be determined. In this case, the image processing means 203 processes two markings 202, 202", the coordinates of both of which are consecutively computed in the image and from which the angle in the system of coordinates X,Y,Z and thus the angle relative to the workpiece or the process sites computed.

Movement of the workpiece through the process station 1 thus results in the coordinates of the bolting sites as well as the coordinates of the markings on the process tool being consecutively computed on the basis of the image of the process station 1, so that on the basis of these coordinates, e.g. an absolute spacing between the bolting sites and the tool in the system of coordinates X,Y,Z of the process station can always be established, thus simultaneously assuring that bolting is done at a correct bolting site.

Continually computing the locations is more particularly of advantage also in series production since then a new workpiece 5 already enters the process station 1 when a previous workpiece 5 is on exit. As soon as the previous workpiece 5 has entered the process station 1 and the corresponding coordinates computed, all enables and process parameter settings are implemented only as regards this identified workpiece 5 thus making sure that the operator does not commence processing the subsequent workpiece 5 already.

The tool cannot be enabled until e.g. the spacing between tool and process site has assumed a predefined value, or until the coordinates of tool and specific process sites (updated in time) agree.

It is, of course, possible to combine an imaging means 201 viewing the workpiece 5 from above and an imaging means viewing the workpiece from the side to achieve three-dimensional resolution in determining the relative location.

The Z coordinates of the workpiece zero point and thus of the workpiece (and its process sites) and of the tool marking (s) and thus of the tool can also be established, however, by analyzing the focussing degree of a camera looking down on the workpiece. When the camera is focussed e.g. to z'=0, then the bolting sites 1(4) are in focus at z'=0 and the bolting site at z'=−10 is out of focus to a defined degree. These Z<<coordinates can then be converted into the Z coordinates once the Z location of the fiducial zero of the workpiece has been analyzed (this being at z=+20 in FIG. 8a).

It is furthermore possible, of course, that the recognizing means or image processing means explicitly recognizes the tool as a whole, instead of merely defining a location on the basis of the marking 202. It is furthermore possible that also the explicit coordinate of the location of the adapter bush is determined on the basis of the sensed marking 202 to sophisticate defining the location, i.e. once specific sections of the process tool have been identified, obtaining the relative location of predefined sections of the process tool (for example, of the adapter bush) is possible on the basis of previously memorized process tool data.

It is on the basis of recognizing locations relative to each other that a wealth of further embodiments are possible.

Figure 10:
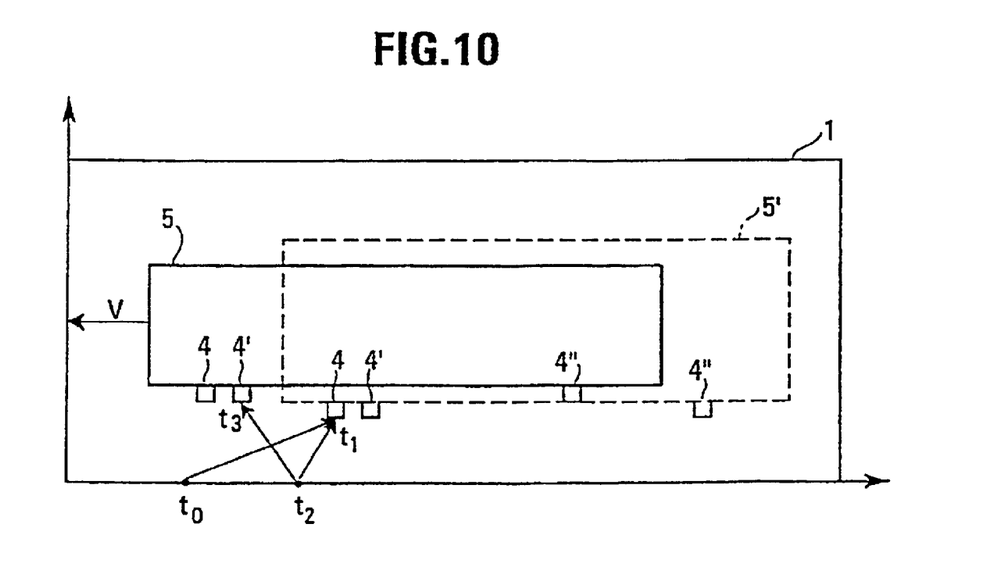
FIG. 10 is a map of the movements as mapped by the recognizing means.

Referring now to FIG. 10 there is illustrated how the image processing means 203 analyzes mapped movements of the process tool 7 in establishing whether a predefined number of process operations has been implemented at the corresponding process sites 4. For example, if the operator fitted an adapter bush at point in time t0 and undertaken processing at the process sites 4 at point in time t1, changed the adapter bush at point in time t2 and the undertaken processing at process sites 4' at point in time t3, then, of course, in the time sequence t0–t3 the workpiece has progressed 5'→5 in the transport direction. Thus, when the spacing of the tool relative to the process site is consecutively analyzed on the basis of the movement maps, the system is always able to recognize whether a programmed process site has been processed.

An enabling means can enable, for example, the process tool 7 at a programmed process site 4'' only when the recognizing means, i.e. the image processing means, has already implemented a predefined number of process operations in the region of a previous process site 4, 4' to thus ensure that no process site is missed.

The recognizing means 200 is able to set each process parameter on the basis of the position (i.e. the spacing) of the process tool 7 relative to the process sites 4 as established. In other words, it is not until the spacing between tool and a programmed process site is smaller than all spacings to other process sites, as can be established by the coordinate computation, that the programming means sets each process parameter for each process site before then enabling the tool.

As explained above, the coordinates are consecutively computed with the workpiece of the move, e.g. in time increments from which the recognizing means is able to sense the speed at which the workpiece is moving from tracking the change in position of the workpiece, for example, of one or more process sites 4.

As in the first aspect, the workpiece 5 may be a motor vehicle or part thereof, the process tool 7 comprising one or more screw drivers or nut runners and the programmed process parameters are bolting parameters. The bolting parameters comprise a torque and/or an torsion angle of the one or more screw drivers or nut runners.

Figure 9:
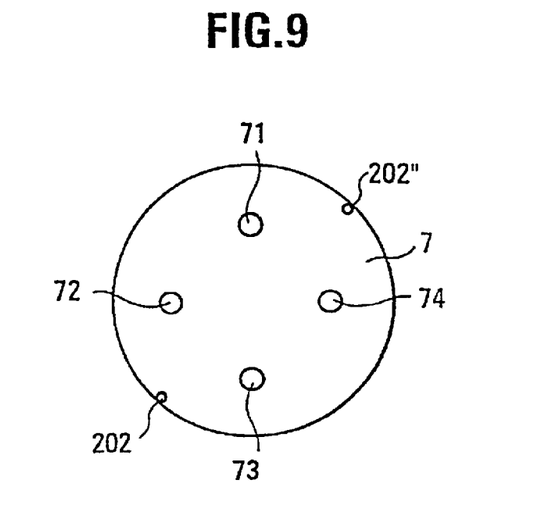
FIG. 9 is a diagram of a process tool including a set of process units.

More particularly, when the process tool 7 comprises a set of process units 71–74, as shown in FIG. 9, sensing the angular orientation, as explained above, may be of major importance. For example, when processing is required several times on part of a vehicle body at a specific section, requiring each process tool 7 as shown in FIG. 9 to be applied at a different angular orientation to the process site(s), then a counter in the recognizing means is able to establish whether the process units have already assumed a predefined number or orientation locations at a programmed process site before an enabling means enables the process tool for processing a further process site. One example thereof is the case in which a set of nut runners 71–74 is applied several times each angularly offset rotationally every time in bolting on a wheel. Since the wheel hub may comprise e.g. 8 bolts, the process tool including the four nut runners needs to be applied twice differingly angled.

As explained above, in accordance with the second aspect of the invention the coordinate location of the process tool and workpiece (or its process sites) is determined, on the basis of which the system can consecutively compute the location at which the process tool is bolting at any one time so that the correct process parameters can be predefined in each case and no process site is missed in processing. In other words, the location of the process site in the process station 1 is determined implicitly in this case, although, of course, it is just as possible for the image processing means to directly identify the process sites the same as in the first aspect of the invention.

It is more particularly in accordance with the second aspect of the invention that a predefined number of process operations at specific sections of the workpiece can be identified, namely by sensing the process tool, sensing the assembly site and determining the position of the one relative to the other. The markings involved may be, for example, a bar code or a luminous marking suitable for display on a monitor so that the recognizing means 200 provides on-line display of the process operation with time, similar to that as shown in FIG. 10.

In the second aspect of the invention too, a process tool having a mounted or integrated imaging means 20a may be used as described with reference to the first aspect of the invention.

Accordingly, all embodiments of the first aspect and second aspect may be used in combination for enhanced process assurance. For example, the mounted or integrated imaging means may be used for recognizing difficult access process sites when in the second aspect of the invention the workpiece is not scanned from all sides by means of several imaging means.

Commercial Application

Although the first aspect and second aspect of the invention have been described with reference to an example in automobile production, it is understood that the process system and process tool in accordance with the invention are applicable to any kind of process operation on a workpiece.

What is claimed is:

1. A system for processing a workpiece (5) located in a predefined process station (1) at a plurality of process sites (4) with programmed process parameters, comprising at least one process tool (7) for processing said workpiece (5) at said process sites (4) and a recognizing means (200) for identifying whether said process tool (7) is located in said process station (1), characterized in that said recognizing means (200) is designed
- to identify said location of said process tool (7) in said process station (1);
- to identify said location of said workpiece (5) in said process station (1); and
- to determine therefrom the location of said process tool (7) relative to each process site (4); whereby said process tool (7) is provided with at least one marking (202) and said recognizing means (200) comprises an imaging means (201) for imaging said process station (1) and at least a section of said workpiece (5), an image processing means (203) identifying the location of said process tool (7) relative to said workpiece (5) by processing an image of said at least one marking (202) and of said at least one section of said workpiece (5), and a means (7) for setting said tool (7) to said process parameters on the basis of the position of said process tool (7) relative to selected process site (4).

2. The process system as set forth in claim 1, characterized in that said image processing means (203) analyze movement maps of said process tool (7) in establishing whether a predefined number of process operations at each of said process sites (4) has been implemented.

3. The process system as set forth in claim 1, characterized in that an enabling means does not enable said identified process tool (7) at a programmed process site (4") until said recognizing means (200) has identified a predefined number of process operations at a previous process site (4).

4. The process system as set forth in claim 3, characterized in that said process tool (7) comprises a set of process units (71–74) having a predefined orientation, said enabling means enabling said process units at a subsequent process site only when a counter means of said recognizing means (200) has established that said process units (71–74) have assumed a predefined number of orientation locations at a previous process site.

5. The process system as set forth in claim 1, characterized in that said recognizing means (200) senses a speed at which said workpiece (4) is moved on the basis of time-tracking a change in position of one or more process sites (4).

6. The process system as set forth in claim 1, characterized in that said recognizing means (200) identifies an angular orientation of said process tool (7) relative to a programmed process site (4).

7. The process system as set forth in claim 1, characterized in that said workpiece (5) is a motor vehicle or part of a motor vehicle, said selected process site (4) is a predefined assembly site on said motor vehicle or on said part, said process station (1) is a predefined station of a motor vehicle assembly line, said process tool (7) comprises one or more screw drivers or nut runners, and said programmed process parameters are bolting parameters of said one or more screw drivers or nut runners.

8. The process system as set forth in claim 7, characterized in that said bolting parameters comprise a torque and/or a torsion angle of said one or more screw drivers or nut runners.

9. The process system as set forth in claim 1, characterized in that said recognizing means (200) comprises a workpiece memory (204) for memorizing workpiece dimensions, said image processing means (204) determines the location of a reference coordinate point of said workpiece image (51) and determines the location of said tool marking (2902) in a system of coordinates (x, y) fixed relative to said process station (1) and determines the location of the tool (7) relative to the workpiece (5) by analyzing the spacings between said coordinates of said marking and each process site (4) with reference to said workpiece dimensions held in said workpiece memory (204).

10. The process system as set forth in claim 9, characterized in that said recognizing means (200) identifies an angular orientation of said process tool (7) relative to a programmed process site (4), said tool is provided with two markings (202, 202') and said image processing means (203) determines said angular orientation of said tool relative to said process site (4) on the basis of analyzing said coordinates of both markings relative to said coordinates of said process sites (4).

* * * * *